US008279366B2

(12) United States Patent
Chen

(10) Patent No.: US 8,279,366 B2

(45) Date of Patent: Oct. 2, 2012

(54) MULTI DOMAIN VERTICAL ALIGNMENT LIQUID CRYSTAL DISPLAY AND A SUBSTRATE THEREOF

(75) Inventor: Chih-Sheng Chen, Hsin-Chu (TW)

(73) Assignee: AU Optronics Corp. (TW)

( * ) Notice: Subject to any disclaimer, the term of this patent is extended or adjusted under 35 U.S.C. 154(b) by 885 days.

(21) Appl. No.: 12/379,326

(22) Filed: Feb. 19, 2009

(65) Prior Publication Data

US 2009/0213287 A1 Aug. 27, 2009

(30) Foreign Application Priority Data

Feb. 19, 2008 (TW) .............................. 97105736 A

(51) Int. Cl.
*G02F 1/136* (2006.01)
*G02F 1/1347* (2006.01)

(52) U.S. Cl. ................ 349/48; 349/39; 349/77; 349/78; 349/79; 349/144; 345/90

(58) Field of Classification Search .................... 349/48, 349/77, 78, 79, 144
See application file for complete search history.

(56) References Cited

U.S. PATENT DOCUMENTS

| | | | | |
|---|---|---|---|---|
| 7,206,048 | B2 * | 4/2007 | Song | 349/129 |
| 2006/0061723 | A1 * | 3/2006 | Mori et al. | 349/141 |
| 2007/0013854 | A1 * | 1/2007 | Yoo et al. | 349/143 |
| 2008/0002072 | A1 * | 1/2008 | Ong | 349/37 |
| 2008/0303970 | A1 * | 12/2008 | Wang et al. | 349/48 |

* cited by examiner

*Primary Examiner* — Edward Glick
*Assistant Examiner* — Sang Nguyen
(74) *Attorney, Agent, or Firm* — Bacon & Thomas, PLLC

(57) ABSTRACT

A multi-domain vertical alignment liquid crystal display and a lower substrate thereof are disclosed. The voltage provided by coupling electrode lines is swung between a high voltage level and a low voltage level. Therefore, with different coupling of a large pixel electrode and of a small pixel electrode that both receive the same color displaying data, the voltage on the large pixel electrode is different from that on the small pixel electrode. The tilt angle of the liquid crystal between the large pixel electrode and the upper electrode is different from the tilt angle of the liquid crystal between the small pixel electrode and the upper electrode for compensating the gamma value of the color. Besides, through adjusting the value of the voltage respectively on the coupling electrode lines to compensate the gamma values of different colors and the gamma values of different colors will tend to be uniform.

31 Claims, 7 Drawing Sheets

MULTI DOMAIN VERTICAL ALIGNMENT LIQUID CRYSTAL DISPLAY AND A SUBSTRATE THEREOF

BACKGROUND OF THE INVENTION

1. Field of the Invention

The invention relates to a display and a substrate thereof, and particularly to a multi domain vertical alignment liquid crystal display (LCD) and a substrate thereof.

2. Description of Related Art

For the techniques utilized in an existing multi domain vertical alignment LCD, negative type liquid crystals and a vertical alignment film are used such that a black picture is displayed as liquid crystal molecules stand vertically due to no voltage. When a voltage is applied, liquid crystal molecules tend to orientate horizontally, thereby displaying a white picture. As compared with a twisted nematic LCD, a multi domain vertical alignment LCD has high contrast, short response time and a large viewing angle.

However, a multi domain vertical alignment LCD still has some problems that are required to be overcome. For example, a multi domain vertical alignment LCD has pixels in same electric field environment, and the tilt angles of the pixels are almost the same. Therefore, due to birefringence effect, the non-uniform of gamma values of red, green and blue colors in the multi domain vertical alignment LCD is easily more serious than that in a twisted nematic LCD. So, as a user watches the displayed picture at the edge of the multi domain vertical alignment LCD, the picture quality is seriously affected by the viewing angle.

SUMMARY OF THE INVENTION

A multi-domain vertical alignment LCD of the present invention includes a lower substrate, an upper substrate, and liquid crystal. The upper substrate includes an upper electrode and a color filter layer. The color filter layer is disposed with a first color dyestuff and a second color dyestuff. The lower substrate, located beneath the upper substrate, includes a plurality of pixels, a plurality of gate lines, a plurality of source lines and a plurality of coupling electrode lines. Each of the pixels includes a first large sub-pixel, a first small sub-pixel, a second large sub-pixel and a second small sub-pixel. The first large sub-pixel and the first small sub-pixel correspond to the first color dyestuff. The second large sub-pixel and the second small sub-pixel correspond to the second color dyestuff. The first small sub-pixel is adjacent to the first large sub-pixel and the second small sub-pixel is adjacent to the second large sub-pixel.

The first large sub-pixel includes a first switch element, a first coupling electrode and a first large pixel electrode. The first coupling electrode is electrically connected to the first large pixel electrode. The first small sub-pixel includes a second switch element, a second coupling electrode and a first small pixel electrode. The second coupling electrode is electrically connected to the first small pixel electrode. The second large sub-pixel includes a third switch element, a third coupling electrode and a second large pixel electrode. The third coupling electrode is electrically connected to the second large pixel electrode. The second small sub-pixel includes a fourth switch element, a fourth coupling electrode and a second small pixel electrode. The fourth coupling electrode is electrically connected to the second small pixel electrode. The gate lines and the source lines are respectively connected to the switch elements.

The first large pixel electrode, the first small pixel electrode, the second large pixel electrode and the second small pixel electrode are respectively floatingly provided between the gate lines and the source lines. Each of the coupling electrode lines is applied a voltage thereon. The liquid crystal is sandwiched between the lower substrate and the upper substrate. The overlapping size of the first coupling electrode and the coupling electrode lines is unequal to the overlapping size of the third coupling electrode and the coupling electrode lines. The overlapping size of the second coupling electrode and the coupling electrode lines is unequal to the overlapping size of the fourth coupling electrode and the coupling electrode lines.

In addition, a lower substrate of a multi-domain vertical alignment LCD of the present invention is placed beneath an upper substrate and assembled with the upper substrate. Liquid crystal is sandwiched between the upper substrate and the lower substrate. The upper substrate includes an upper electrode and a color filter layer. The color filter layer is disposed with a first color dyestuff and a second color dyestuff. The first color dyestuff and the second color dyestuff are selected from an optical combination of red, green and blue dyestuffs. The lower substrate includes a plurality of gate lines, a plurality of source lines, a plurality of coupling electrode lines, and a plurality of pixels. A voltage is applied respectively on the coupling electrodes.

Each of the pixels includes a first large sub-pixel, a first small sub-pixel, a second large sub-pixel and a second small sub-pixel. The first large sub-pixel and the first small sub-pixel correspond to the first color dyestuff, and the second large sub-pixel and the second small sub-pixel correspond to the second color dyestuff. The first small sub-pixel is adjacent to the first large sub-pixel and the second small sub-pixel is adjacent to the second large sub-pixel.

The first large sub-pixel includes a first switch element, a first coupling electrode and a first large pixel electrode. The first coupling electrode is electrically connected to the first large pixel electrode. The first small sub-pixel includes a second switch element, a second coupling electrode and a first small pixel electrode. The second coupling electrode is electrically connected to the first small pixel electrode. The second large sub-pixel includes a third switch element, a third coupling electrode and a second large pixel electrode. The third coupling electrode is electrically connected to the second large pixel electrode. The second small sub-pixel includes a fourth switch element, a fourth coupling electrode and a second small pixel electrode. The fourth coupling electrode is electrically connected to the second small pixel electrode. The gate lines and the source lines are respectively connected to the switch elements. The first large pixel electrode, the first small pixel electrode, the second large pixel electrode and the second small pixel electrode are respectively floatingly provided between the gate lines and the source lines.

The overlapping size of the first coupling electrode and the coupling electrode lines is unequal to the overlapping size of the third coupling electrode and the coupling electrode lines, and the overlapping size of the second coupling electrode and the coupling electrode lines is unequal to the overlapping size of the fourth coupling electrode and the coupling electrode lines.

Therefore, in the present invention, the design of the unequal overlapping size of the coupling electrode lines respectively with the first coupling electrode, the second coupling electrode, the third coupling electrode and the fourth coupling electrode, with the feature of a different voltage respectively applied on each of the coupling electrode lines to adjust the tilt angle of the liquid crystal in the liquid crystal capacitance, makes the tilt angles of the liquid crystal different to compensate the gamma values.

Moreover, to compensate the liquid crystal capacitance receiving displaying data of various colors, the present invention further proposes to adjust the voltage respectively on each of the coupling electrode lines, corresponding to the color of upper electrode. Therefore, the gamma values of various colors of the multi-domain vertical alignment LCD (or the entire lower substrate of the multi-domain vertical alignment LCD) will tend to be uniform.

DETAILED DESCRIPTION OF THE INVENTION

Figure 1:
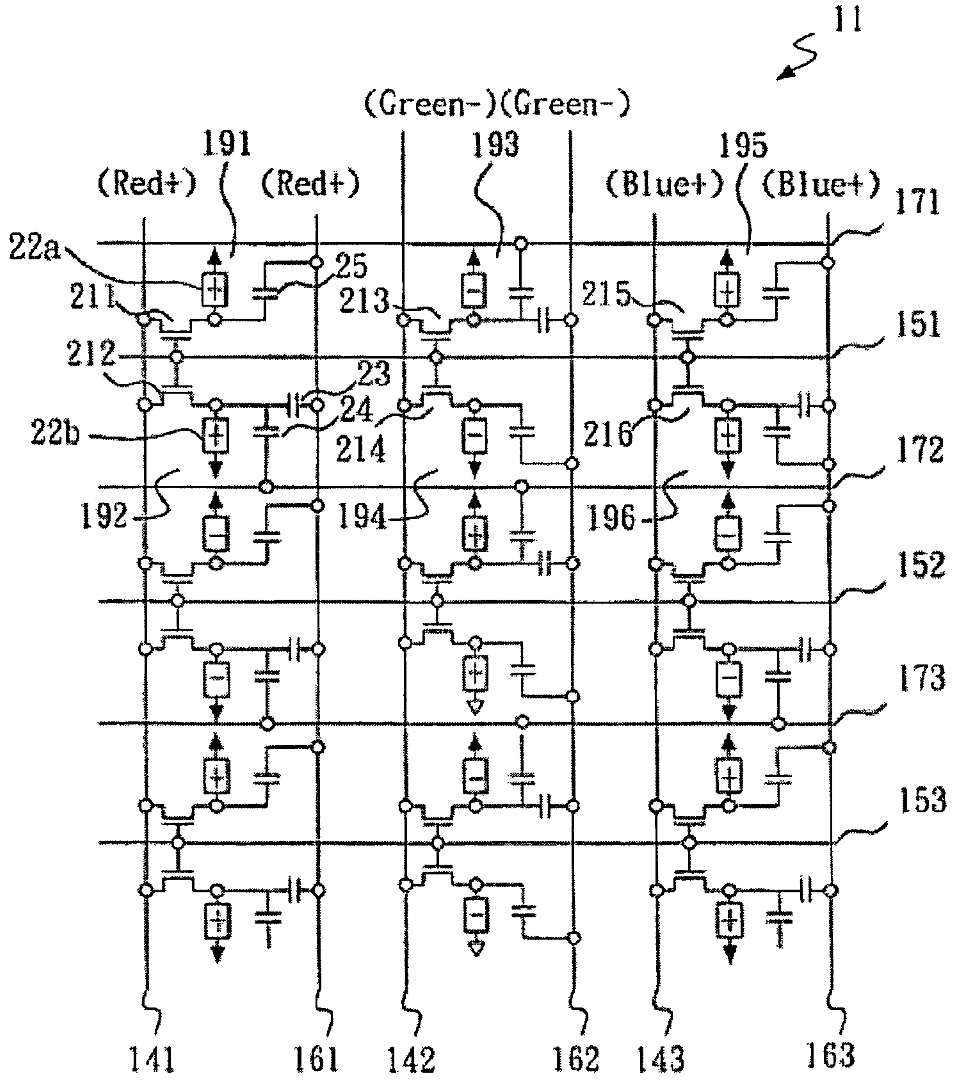
FIG. 1 is a schematic diagram showing a preferred embodiment of a multi-domain vertical alignment LCD according to the present invention.
Figure 2A:
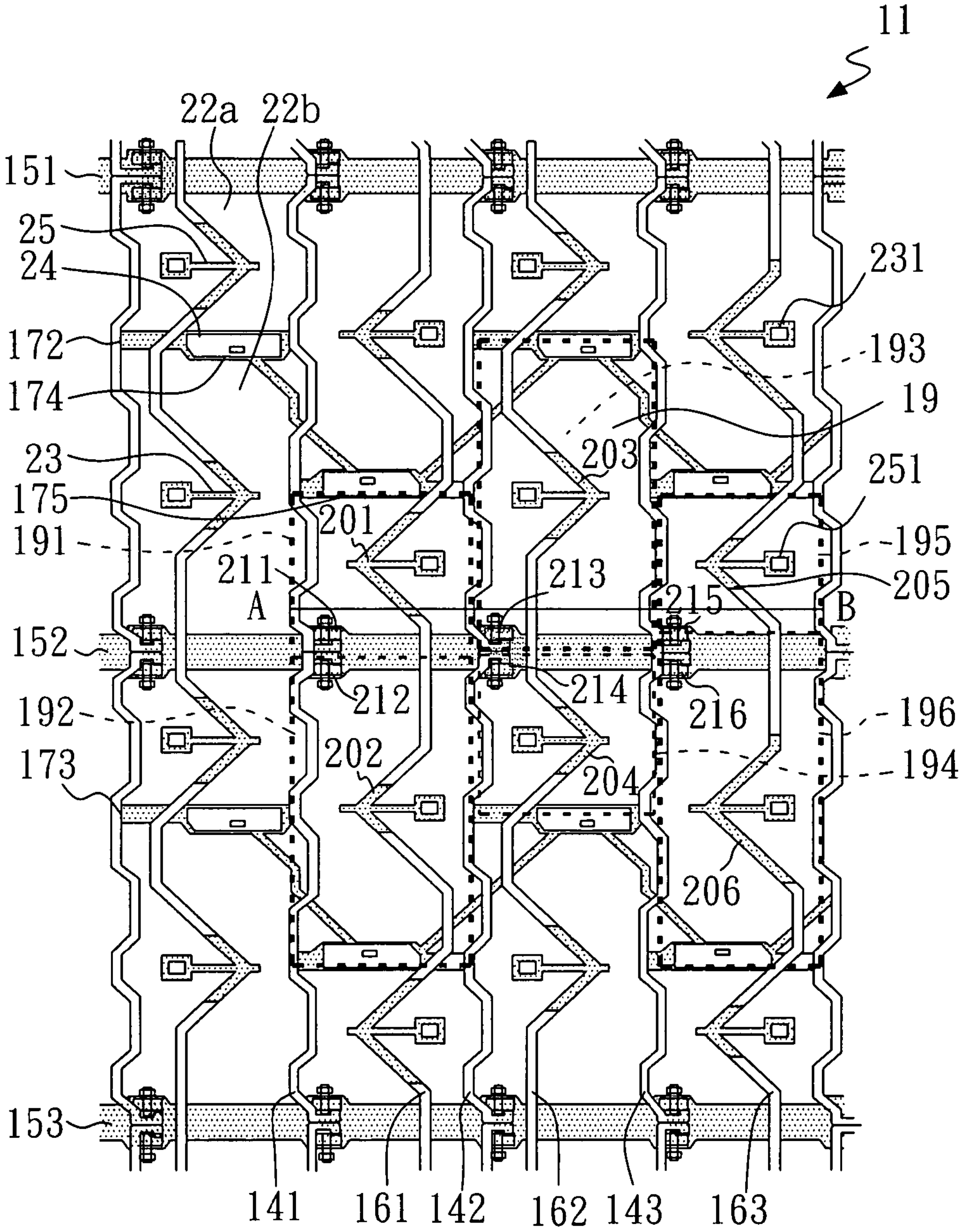
FIG. 2A is a schematic diagram showing a preferred embodiment of a metal circuit for a lower substrate of a multi-domain vertical alignment LCD according to the present invention.
Figure 2B:
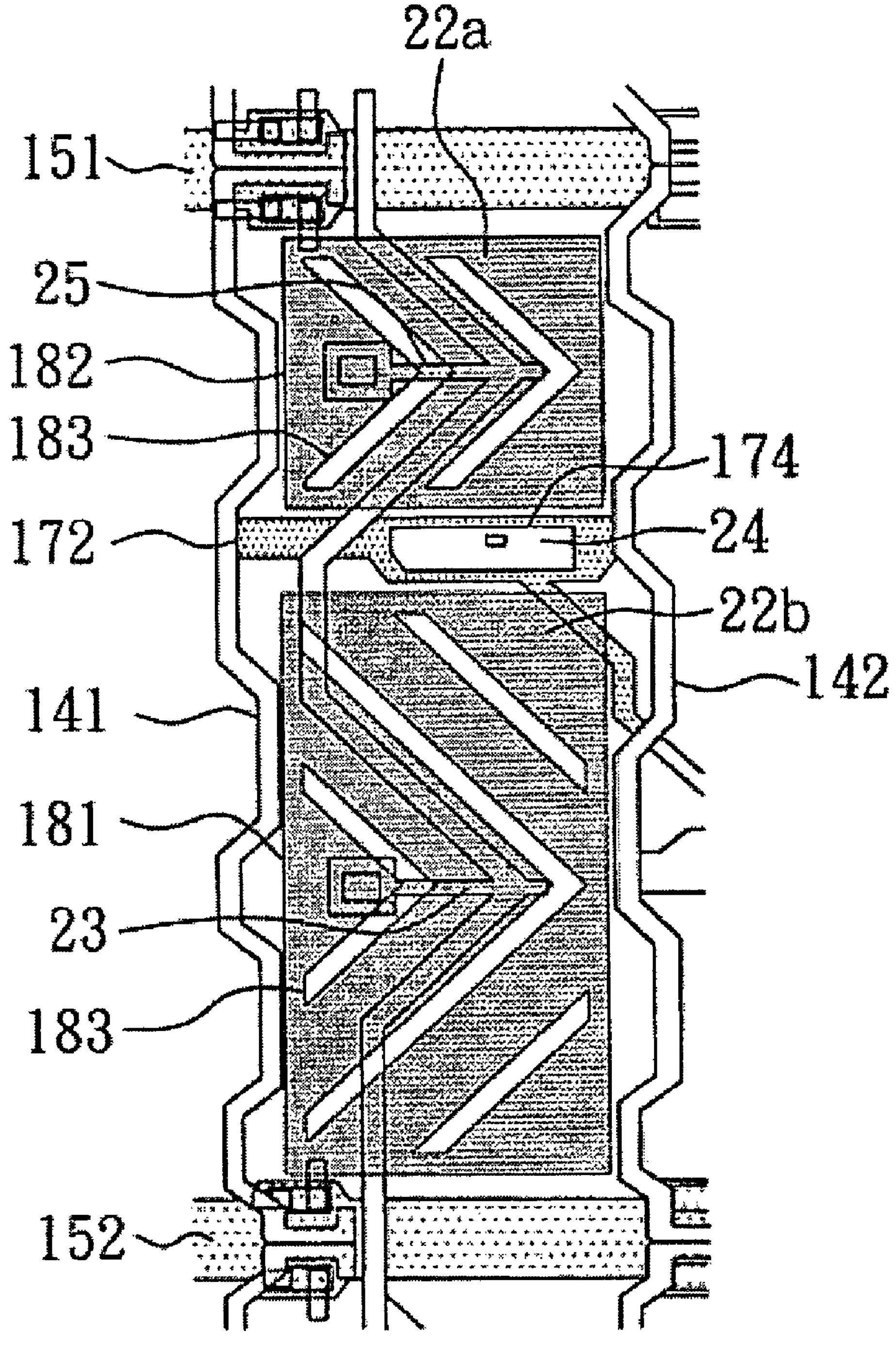
FIG. 2B is a schematic diagram showing a preferred embodiment of a lower substrate of a multi-domain vertical alignment LCD according to the present invention.

FIG. 1 is a schematic diagram showing a preferred embodiment of a multi-domain vertical alignment LCD of the invention. FIG. 2A is a schematic diagram showing a preferred embodiment of a metal circuit for a lower substrate of a multi-domain vertical alignment LCD of the invention. FIG. 2B is a schematic diagram showing the lower substrate of FIG. 2A. FIGS. 3A to 3F are schematic diagrams showing voltages of a preferred embodiment of a multi-domain vertical alignment LCD of the invention. FIG. 4 is a cross-sectional diagram taken along line AB in FIG. 2A. In addition, the drawings and labels therein are provided merely for reference and interpretation, but not for limiting the position, quantity and distribution of the elements of the invention.

As shown in FIG. 4, a multi-domain vertical alignment liquid crystal display (LCD) 1 of the present invention includes a lower substrate 11, an upper substrate 12, and liquid crystal 13 sandwiched between the lower substrate 11 and the upper substrate 12.

The upper substrate 12 includes an upper electrode 34, a color filter layer 35 and a plurality of protrusions 33. The color filter layer 35 is disposed with red, green and blue dyestuffs thereon.

The lower substrate 11 includes a gate insulator layer 31, a passivation layer 32 and a plurality of pixels (not shown). Referring to FIG. 1, on the lower substrate 11, two metal-layer processes are used to make a plurality of gate lines 151, 152 and 153, a plurality of source lines 141, 142 and 143, a plurality of common electrode lines 171, 172 and 173, and a plurality of coupling electrode lines 161, 162 and 163. In details, the gate lines 151, 152 and 153 and the common electrode lines 171, 172 and 173 may be made of a first metal layer. The source lines 141, 142 and 143 and the coupling electrode lines 161, 162 and 163 may be made of a second metal layer. Referring to FIG. 2A, on the common electrode lines 171, 172 and 173, a plurality of common electrodes 174 and 175 may be made of the second metal layer. The pixels 19 includes a plurality of sub-pixels 191, 192, 193, 194, 195 and 196, and the scopes of the sub-pixels 191, 192, 193, 194, 195 and 196 are respectively labeled with dotted lines in the drawing. Locations of the sub-pixels 191 and 192 may correspond to the red dyestuff region of the color filter layer, locations of the sub-pixels 193 and 194 may correspond to the green dyestuff region of the color filter layer, and locations of the sub-pixels 195 and 196 may correspond to the blue dyestuff region of the color filter layer. The above description is only for illustration, but not to limit the invention. The adjustment for the invention may be made according to the practical requirements.

As shown in FIG. 2A, the sub-pixel 191 (192/193/194/195/196) may include a switch elements 211 (212/213/214/215/216), a coupling electrode 201 (202/203/204/205/206), and a pixel electrode (not shown). The pixel electrode of the sub-pixel is floatingly provided between two adjacent gate lines 151, 152 and 153, and two adjacent source lines 141, 142 and 143. The coupling electrodes 201, 202, 203, 204, 205 and 206 are located beneath the coupling electrode lines 161, 162 and 163, and the coupling electrodes 201, 202, 203, 204, 205 and 206 have respectively different sizes of overlapping with the coupling electrode lines 161, 162 and 163. The coupling electrodes 201, 202, 203, 204, 205 and 206 may be made of the metal layer of the gate lines 151, 152 and 153 and may be electrically connected to the pixel electrodes (not shown) respectively via contact points 231 and 151. In the embodiment, for each of the sub-pixels 191, 192, 193, 194, 195 and 196 corresponding to a different color dyestuff of the color filter layer, the design of different sizes of the coupling electrodes 201, 202, 203, 204, 205 and 206 is made. The theory of the invention will be explained in detail hereinafter.

As shown in FIGS. 2A and 2B, the sub-pixels 192, 193 and 196 separately having a large pixel electrode 181 may be interleaved with the sub-pixels 191, 194 and 195 separately having a small pixel electrode 182 on the lower substrate. The size of the large pixel electrode 181 is larger than that of the small pixel electrode 182. In the embodiment, the size of the large pixel electrode 181 may substantially be twice the size of the small pixel electrode 182. The above-mentioned way of arrangement, scale, and size is only for illustration. They may be adjusted according to the practical requirement in the invention.

As shown in FIG. 2B, a plurality of slits 183 may be provided in the large pixel electrodes 181 and the small pixel electrodes 182. The arrangement of the slits 183 and the protrusions 33 (FIG. 4) are formed to make a vertical alignment domain. The switch elements 211, 212, 213, 214, 215 and 216 can be thin film transistors and are formed on the gate lines 151, 152 and 153. The gate lines 151, 152 and 153 are electrically connected to the gates (not shown) of the corresponding switch elements 211, 212, 213, 214, 215 and 216. The source lines 141, 142 and 143 are electrically connected to the sources (not shown) of the corresponding switch elements 211, 212, 213, 214, 215 and 216.

Referring to FIG. 4, the gate insulator layer 31 is an insulator to electrically separate the first metal layer and the second metal layer. In addition, the passivation layer 32 may be made of an inorganic material, such as a semiconductor oxide, may be made of an organic material, such as a resin material, or may be made of a multi-layer structure formed by the organic material and the inorganic material, so as to protect the metal circuit from oxidation. The disclosure here is only for illustration and not to limit the invention. Adjustments may be made according to the practical requirements.

As shown in FIG. 1, each of the common electrode lines 171, 172 and 173 is provided between two corresponding adjacent gate lines 151, 152 and 153. The common electrode lines 171, 172 and 173 provide common voltages (Vcom) as a ground line for the multi-domain vertical alignment LCD.

In the embodiment, each of the coupling electrode lines 161, 162 and 163 is provided with a saw-tooth circuit (FIG. 2A) between two corresponding adjacent source lines 141, 142 and 143 and a voltage is respectively applied thereon. In the embodiment, each of the protrusions 33 (FIG. 4) on the upper substrate 12 may correspond to the upper side of the coupling electrode lines 161, 162 and 163, the gate lines 151, 152 and 153, the source lines 141, 142 and 143, the common electrode lines 171, 172 and 173, or a combination thereof, Therefore, an aperture ratio of the multi-domain vertical alignment LCD 1 will be increased. The location and shape of the protrusions are only for illustration. The invention is not limited to the above description and may be adjusted according to the practical requirements.

Refer to FIGS. 2A, 2B and 4. For the sub-pixels 192, 193 and 196, a liquid crystal capacitance 22*b* is formed between the upper electrode 34 and the large pixel electrode 181, and the liquid crystal 13 is sandwiched between the upper electrode 34 and the large pixel electrode 181. For the sub-pixels 192, 193 and 196, a first capacitance 23 is formed between each of the coupling electrode lines 161, 162 and 163 and the corresponding coupling electrode 202, 203 and 206. For the sub-pixels 192, 193 and 196, a second capacitance 24 is formed between each of the common electrode lines 171, 172 and 173 and the corresponding common electrode 174 and 175. On the other hand, for the sub-pixels 191, 194 and 195, another liquid crystal capacitance 22*a* is formed between the upper electrode 34 and the small pixel electrode 182, and the liquid crystal 13 is sandwiched between the upper electrode 34 and the small pixel electrode 182. For the sub-pixels 191, 194 and 195, a third capacitance 25 is formed between each of the coupling electrode lines 161, 162 and 163 and the corresponding coupling electrode 201, 204 and 205. The capacitance values of the first capacitance 23 and the third capacitance 25 may be controlled by the size and material of the coupling electrodes 201, 202, 203, 204, 205 and 206, and controlled by the magnitude of the voltage applied to the coupling electrode lines 161, 162 and 163.

The operation way of the embodiment will be explained with reference to FIGS. 1, 2A, 2B and 3A to 3F. In a pixel, through the same source line, the sub-pixel having the large pixel electrode and the sub-pixel having the small pixel electrode can receive the voltage signal that representing the same color. For example, the sub-pixel 192 having the large pixel electrode 181 and the sub-pixel 191 having the small pixel electrode 182 can receive the voltage signal representing the red color data through the same source line 141; the sub-pixel 193 having the large pixel electrode 181 and the sub-pixel 194 having the small pixel electrode 182 can receive the voltage signal representing the green color data through the same source line 142; and the sub-pixel 196 having the large pixel electrode 181 and the sub-pixel 195 having the small pixel electrode 182 can receive the voltage signal representing the blue color data through the same source line 143. The above disclosure is merely for illustration. The invention is not limited to above description and may be adjusted according to the practical requirements.

Figure 3A:
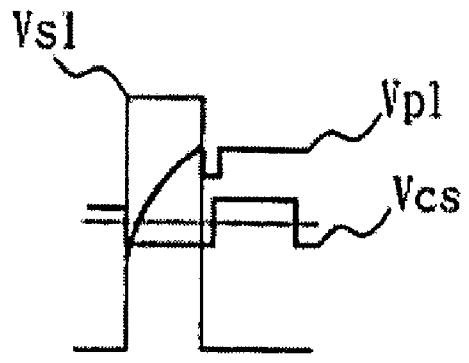
FIGS. 3A to 3F are schematic diagrams showing time-voltage relation of a preferred embodiment of a multi-domain vertical alignment LCD according to the present invention.
Figure 3B:
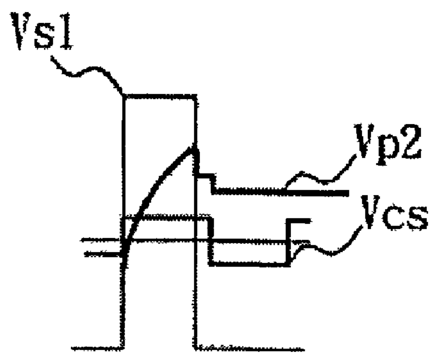
Figure 3C:
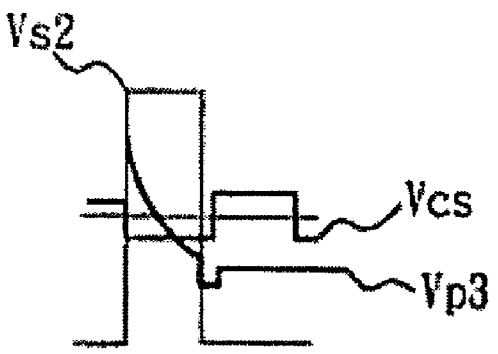
Figure 3D:
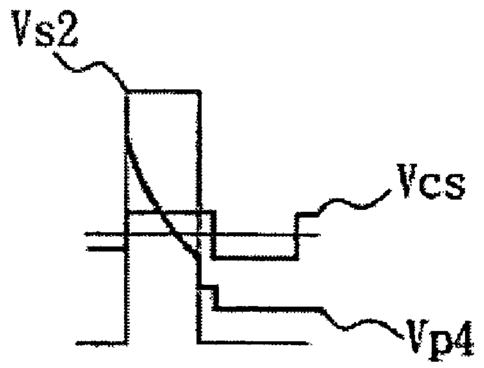
Figure 3E:
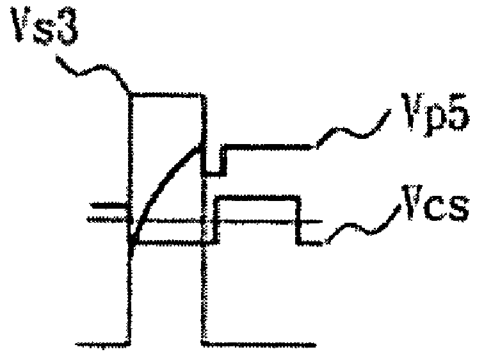
Figure 3F:
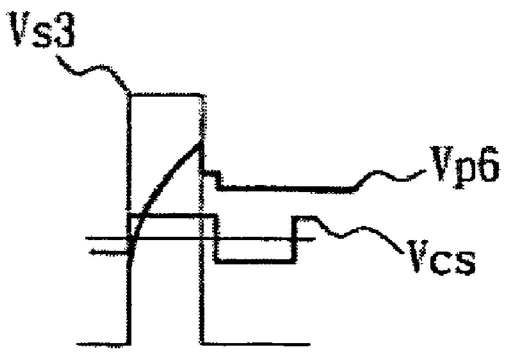
Figure 4:
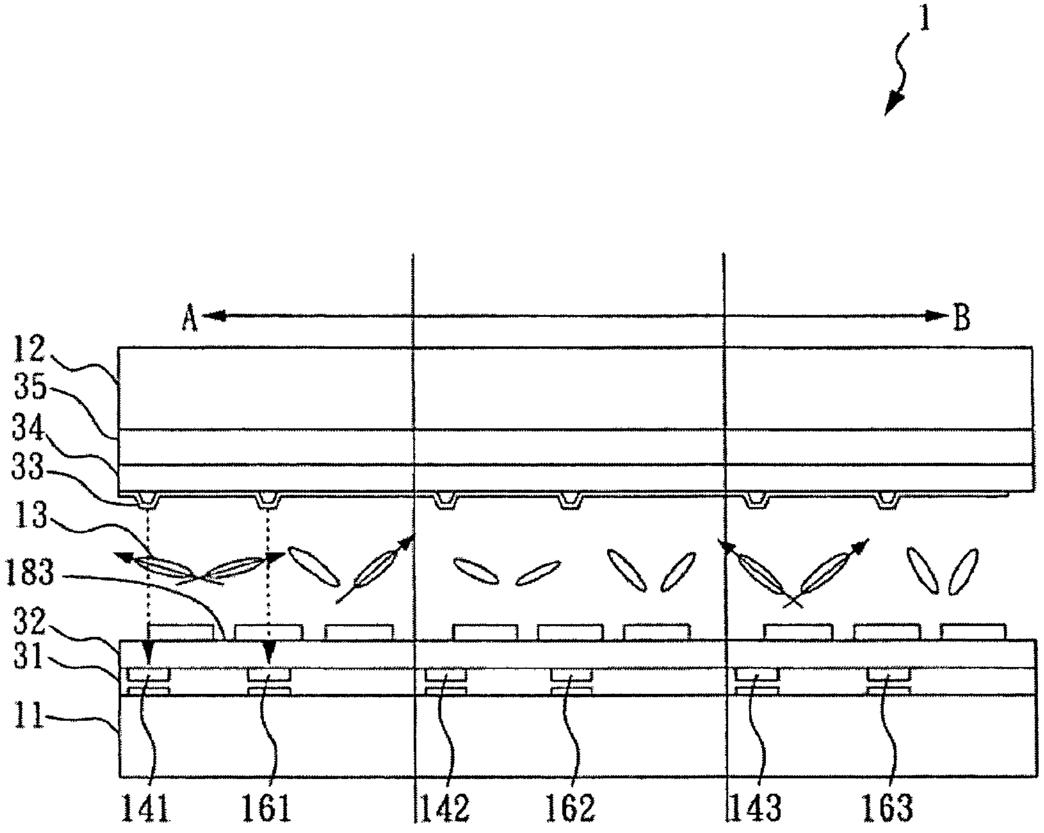
FIG. 4 is a cross-sectional diagram showing a preferred embodiment of a multi-domain vertical alignment LCD according to the present invention.

As shown in FIGS. 3A to 3F, FIG. 3A is a schematic diagram showing time-voltage relation for the sub-pixel 191, FIG. 3B is a schematic diagram showing time-voltage relation for the sub-pixel 192, and FIG. 3C is a schematic diagram showing time-voltage relation for the sub-pixel 193. FIGS. 3D, 3E and 3F can be inferred by the above description.

The voltage of the coupling electrode lines 161, 162 and 163 is varied between a high voltage level (Vcs_high) and a low voltage level (Vcs_low). The swinging period of the voltage of the coupling electrode lines 161, 162 and 163 may be the same as that of the voltage of the source lines 141, 142 and 143. The magnitude of the voltage of the coupling electrode lines 161, 162 and 163 may be varied according to the voltage signal of the source lines 141, 142 and 143 representing the color data. Moreover, in this embodiment, the voltage of the coupling electrode line 162 of the sub-pixel 193 has a 180 degree phase difference from that of the coupling electrode line 161 of the adjacent sub-pixel 192 (or from that of the coupling electrode line 163 of the adjacent sub-pixel 196). The voltage of the coupling electrode line 162 of the sub-pixel 194 has a 180 degree phase difference from that of the coupling electrode line 161 of the adjacent sub-pixel 191 (or from that of the coupling electrode line 163 of the adjacent sub-pixel 195).

As voltages Vs1 and Vs3 of displaying data from the source lines 141 and 143 are respectively transmitted to the sub-pixels 192 and 196, voltages Vp2 and Vp6 respectively of the large pixel electrodes 181 of the sub-pixels 192 and 196 are gradually increased to predetermined voltages. And when the voltages Vp2 and Vp6 are not continuously raisen by the voltages Vs1 and Vs3 from the source lines 141 and 143, and the voltages Vcs_low from the coupling electrode lines 161 and 163 are provided, the voltages Vp2 and Vp6 of the large pixel electrode 181 will drop.

However, for the sub-pixels 191 and 195, voltages Vp1 and Vp5 of the small pixel electrodes 182 are respectively increased to predetermined voltages via the voltages Vs1 and Vs3 from the source lines 141 and 143. And voltages Vp1 and Vp5 of the small pixel electrodes 182 are continuously increased via the voltage Vcs_high from the coupling electrode lines 161 and 163. Therefore, the voltages Vp1 and Vp5 of the small pixel electrodes 182 of the sub-pixels 191 and 195 are different from the voltages Vp2 and Vp6 of the large pixel electrodes 181 of the sub-pixels 192 and 196. The tilt angle of the liquid crystal 13 between the large pixel electrode 181 and the upper electrode 34 is different from the tilt angle of the liquid crystal 13 between the small pixel electrode 182 and the upper electrode 34. As a result, the displaying brightness of the sub-pixels 191 and 195 is brighter than that of the sub-pixels 192 and 196.

Therefore, for the red displaying data, controlling the voltage of the coupling electrode line 161 is the way of controlling the tilt angle of the liquid crystal 13 of the sub-pixels 191 and 192. As a result, the red displaying data is displayed by the sub-pixels 191 and 192 respectively having different tilt angles of the liquid crystal 13 for compensating the red gamma value. For the blue displaying data, the principle is the same as described above.

In addition, for the sub-pixels 193 and 194, the polarity of the voltages Vp3 and Vp4, respectively of the large pixel electrode 181 and the small pixel electrode 182, is activated by a negative source. As voltage Vs2 of the displaying data from the source line 142 is transmitted to the sub-pixels 193 and 194, the voltages Vp3 and Vp4 are decreased. The voltages Vp3 and Vp4 are decreased to pre-determined values and the voltage Vs2 from the source line 142 do not continuously lower the voltages Vp3 and Vp4. Therefore, for the sub-pixel 193, through coupling with the voltage of the coupling electrode line 162 at Vcs_high, the voltage Vp3 of the large pixel electrode 181 is raisen. For the sub-pixel 194, through coupling with the voltage of the coupling electrode line 162 at Vcs_low, the voltage Vp4 of the small pixel electrode 182 continues to descend. Therefore, the voltage Vp3 of the large pixel electrode 181 of the sub-pixel 193 is different from the voltage Vp4 of the small pixel electrode 182 of the sub-pixel 194. Hence, the tilt angle of the liquid crystal 13 between the large pixel electrode 181 and the upper electrode 34 is different from the tilt angle of the liquid crystal 13 between the small pixel electrode 182 and the upper electrode 34 for compensating the green gamma value. In the embodiment, the voltages respectively on the coupling electrode lines 161, 162 and 163 may be respectively controlled to compensate the gamma value of the red, green and blue colors, and to make the gamma values to be very close to each other and substantially the same.

For the large pixel electrode 181, the relation formula of the voltage respectively on the coupling electrode lines 161, 162 and 163 is as follows:

$$Vp=Vs+(Cst1\_coupling/(Cst1\_coupling+Clc1+Cgd1+Cst1))\times Vcs(n)$$

wherein Vp represents the voltage Vp2, Vp3 or Vp6 on the large pixel electrode 181, Vs represents the voltage Vs1, Vs2 or Vs3 respectively from the source lines 141, 142 and 143, Vcs(n) is a voltage provided by the coupling electrode line 161, 162 or 163, in which Vcs(n) is either Vcs_high or Vcs_low, Cst1_coupling is the first capacitance 23, Clc1 is the liquid crystal capacitance 22*b*, Cgd1 is the capacitance between the gate and drain (not shown) respectively of the switch elements 212, 213 and 216, and Cst1 is the second capacitance 24. Therefore, in the embodiment, for the sub-pixels 192, 193 and 196, the different size of each of the coupling electrodes 202, 203 and 206 is designed to adjust the magnitude of the first capacitance 23 of each of the sub-pixels 192, 193 and 196 to produce a different Vp. The gamma value of each of the red, green and blue displaying data can be adjusted. In this embodiment, a small size of the coupling electrode 202 is designed for the sub-pixel 192 for receiving the red displaying data, a medium size of the coupling electrode 203 is designed for the sub-pixel 193 for receiving the green displaying data, and a large size of the coupling electrode 206 is designed for the sub-pixel 196 for receiving the blue displaying data. However, the invention is not limited to the above description and adjustments may be made according to the practical requirements.

For the small pixel electrode 182, the relation formula of the voltage respectively on the coupling electrode lines 161, 162 and 163 is as follows:

$$Vp'=Vs+(Cst2\_coupling/(Cst2\_coupling+Clc2+Cgd2))\times Vcs(n)$$

wherein Vp' represents the voltage Vp1, Vp4 or Vp5 on the small pixel electrode 182, Vs represents the voltage Vs1, Vs2 or Vs3 respectively from the source lines 141, 142 and 143, Vcs(n) is a voltage provided by the coupling electrode line 161, 162 or 163, in which Vcs(n) is either Vcs_high or Vcs_low, Cst2_coupling is the third capacitance 25, Clc2 is the liquid crystal capacitance 22*a*, and Cgd2 is the capacitance between the gate and drain (not shown) respectively of the switch elements 211, 214 and 215. Therefore, in the embodiment, for the sub-pixels 191, 194 and 195, the different size of each of the coupling electrodes 201, 204 and 205 is designed to adjust the magnitude of the third capacitance 25 of each of the sub-pixels 191, 194 and 195 to produce a different Vp'. The gamma value of each of the red, green and blue displaying data can be adjusted. In this embodiment, a large size of the coupling electrode 201 is designed for the sub-pixel 191 for receiving the red displaying data, a medium size of the coupling electrode 204 is designed for the sub-pixel 194 for receiving the green displaying data, and a small size of the coupling electrode 205 is designed for the sub-pixel 195 for receiving the blue displaying data. However, the invention is not limited to the above description and adjustments may be made according to the practical requirements.

In the sub-pixels 191, 192, 193, 194, 195 and 196, for the large pixel electrodes 181 and the small pixel electrodes 182 that both receive the same color displaying data, the voltage of the large pixel electrode 181 and the voltages of the small pixel electrode 182 are different such that the orientation of the molecules of the liquid crystal 13 sandwiched between the large pixel electrode 181 and the upper electrode 34 is different from the orientation of the molecules of the liquid crystal 13 sandwiched between the small pixel electrode 182 and the upper electrode 34.

Further, the optical refraction formula, derived from the characteristics of the liquid crystal, is as follows:

$$T=\sin^2(2\phi))\times\sin^2[(\pi\times\Delta n(\theta)\times d)/\lambda]$$

wherein T represents a light refraction ratio, $\phi$ represents an incident angle, $\Delta n(\theta)$ represents a refraction coefficient of the liquid crystal in a voltage-applied environment, d represents a distance between a large pixel electrode 181 (or a small pixel electrode 182) and the upper electrode 34, and $\lambda$ represents a wavelength.

However, $\Delta n(\theta)$ is changed depending on the orientation of the molecules of the liquid crystal 13. Therefore, as the orientation of the molecules of the liquid crystal 13 of the sub-pixel 191, 192, 193, 194, 195 or 196 is different, $\Delta n(\theta)$ will be different accordingly such that the light refraction ratio T is also different, and the gamma value of the color is compensated.

Each of the sub-pixels 192, 193 and 196 has a large pixel electrode 181, and the magnitude of the voltages respectively on the coupling electrode lines 161, 162 and 163 are adjusted such that the coupling capacitance value of the sub-pixel 192 for receiving the red displaying data is small, the coupling capacitance value of the sub-pixel 193 for receiving the green displaying data is medium and the coupling capacitance value of the sub-pixel 196 for receiving the blue displaying data is large.

On the other hand, each of the sub-pixels 191, 194 and 195 has a small pixel electrode 182, and the coupling capacitance value of the sub-pixel 191 for receiving the red displaying data is large, the coupling capacitance value of the sub-pixel 194 for receiving the green displaying data is medium, and the coupling capacitance value of the sub-pixel 195 for receiving the blue displaying data is small. Therefore, the gamma value of each colors tends to become uniform and the invention has the advantages of high contrast and better dark state effect.

In addition, the range of the ratios of the coupling capacitance values to the liquid crystal capacitance 22*a* or 22*b* in the sub-pixel 191, 192, 193, 194, 195 or 196 is as follows:

with respect to the sub-pixel 192 for showing the red displaying data: $0.25<(Cst1\_coupling/Clc1)<0.35$;

with respect to the sub-pixel 193 for showing the green displaying data: $0.30<(Cst1\_coupling/Clc1)<0.40$:

with respect to the sub-pixel 196 for showing the blue displaying data: $0.35<(Cst1\_coupling/Clc1)<0.45$;

with respect to the sub-pixel 191 for showing the red displaying data: 0.85<(Cst2_coupling/Clc2)<0.95;

with respect to the sub-pixel 194 for showing the green displaying data: 0.70<(Cst2_coupling/Clc2)<0.80; and with respect to the sub-pixel 195 for showing the blue displaying data: 0.55<(Cst2_coupling/Clc2)<0.65.

The invention is not limited to the above description and may be adjusted according to the practical requirements.

Figure 5:
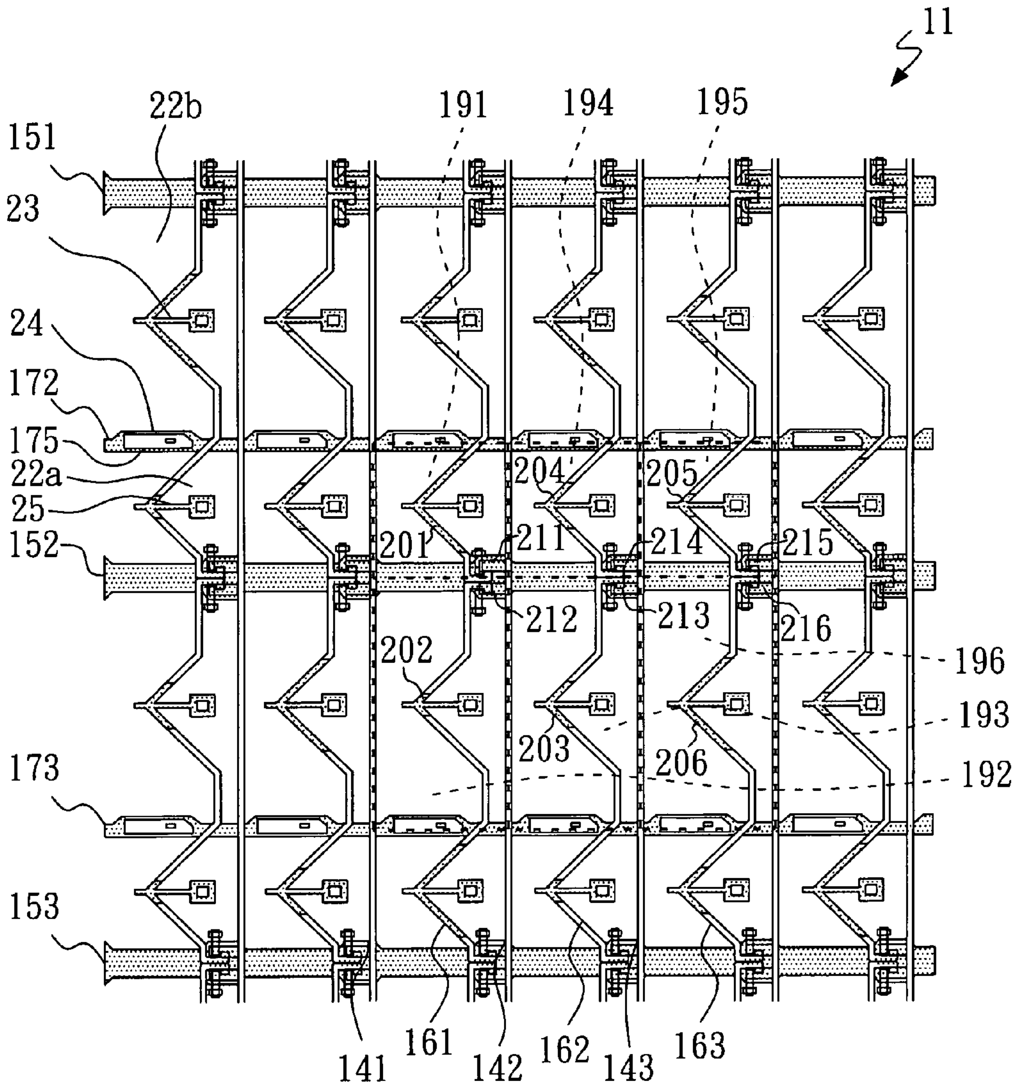
FIG. 5 is a schematic diagram showing another preferred embodiment of a metal circuit for a lower substrate of a multi-domain vertical alignment LCD according to the present invention.
Figure 6A:
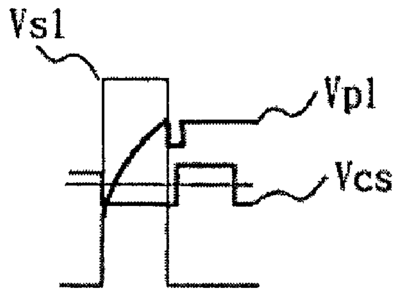
FIGS. 6A to 6F are schematic diagrams showing time-voltage relation of another preferred embodiment of a multi-domain vertical alignment LCD according to the present invention.
Figure 6B:
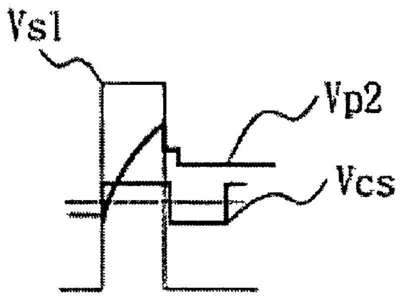
Figure 6C:
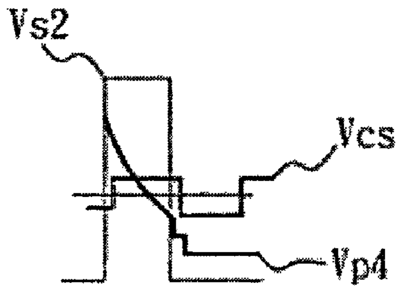
Figure 6D:
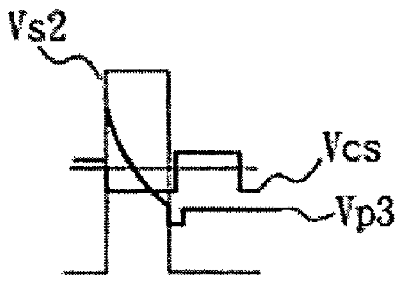
Figure 6E:
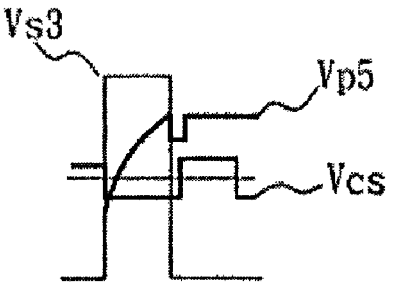
Figure 6F:
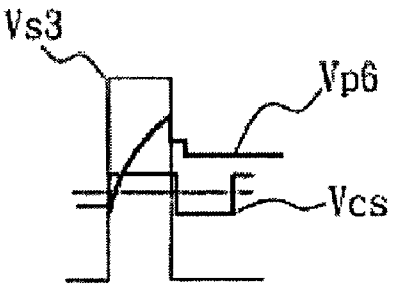

FIG. 5 is a schematic diagram showing a lower substrate in a multi-domain vertical alignment LCD of another preferred embodiment of the invention. FIGS. 6A to 6F are schematic diagrams showing time-voltage relation of the multi-domain vertical alignment LCD of the preferred embodiment. FIG. 6A corresponds to the sub-pixel 191, FIG. 6B corresponds to the sub-pixel 192, FIG. 6C corresponds to the sub-pixel 194, FIG. 6D corresponds to the sub-pixel 193, FIG. 6E corresponds to the sub-pixel 195, and FIG. 6F corresponds to the sub-pixel 196.

The following description is merely about the difference between another preferred embodiment and the preferred embodiment shown in FIGS. 1 to 4. In the second preferred embodiment, the sub-pixels 192, 193 and 196, respectively having the large pixel electrodes 181, are arranged to be aligned side by side on the lower substrate 11. And the sub-pixels 191, 194 and 195, respectively having the small pixel electrode 182, are also arranged to be aligned side by side.

Accordingly, in the multi-domain vertical alignment LCD of the invention, the voltage, provided by coupling electrode lines, is varied between a high voltage level and a low voltage level to have different coupling for a large pixel electrode and a small pixel electrode that both receive the same color display data. Therefore, the voltage of the large pixel electrode is different from that of the small pixel electrode, and the tilt angle of the liquid crystal between the large pixel electrode and the upper electrode is different from the tilt angle of the liquid crystal between the small pixel electrode and the upper electrode to compensate the gamma value of the color. Besides, through adjusting the value of the voltage respectively on the coupling electrode lines to compensate the gamma values of different colors, the gamma values of different colors will tend to be uniform.

Though the invention is disclosed with the embodiments mentioned above, such disclosure should not limit the invention. Any person having ordinary skills in the same technical field of the invention can make various changes and modifications without departing from the spirit and scope of the invention. Therefore, the scope of the claimed invention should be defined by the appended claims.

What is claimed is:

1. A multi-domain vertical alignment liquid crystal display (LCD) comprising:

an upper substrate comprising an upper electrode and a color filter layer, the color filter layer being disposed with a first color dyestuff and a second color dyestuff;

a lower substrate, located beneath the upper substrate, comprising a plurality of pixels, a plurality of gate lines, a plurality of source lines and a plurality of coupling electrode lines;

each of the pixels comprising a first large sub-pixel, a first small sub-pixel, a second large sub-pixel and a second small sub-pixel, in which the first large sub-pixel and the first small sub-pixel correspond to the first color dyestuff, and the second large sub-pixel and the second small sub-pixel correspond to the second color dyestuff, and in which the first small sub-pixel is adjacent to the first large sub-pixel and the second small sub-pixel is adjacent to the second large sub-pixel;

the first large sub-pixel comprising a first switch element, a first coupling electrode and a first large pixel electrode, in which the first coupling electrode is electrically connected to the first large pixel electrode, the first small sub-pixel comprising a second switch element, a second coupling electrode and a first small pixel electrode, in which the second coupling electrode is electrically connected to the first small pixel electrode, the second large sub-pixel comprising a third switch element, a third coupling electrode and a second large pixel electrode, in which the third coupling electrode is electrically connected to the second large pixel electrode, the second small sub-pixel comprising a fourth switch element, a fourth coupling electrode and a second small pixel electrode, in which the fourth coupling electrode is electrically connected to the second small pixel electrode, the gate lines and the source lines being respectively connected to the switch elements, while the first large pixel electrode, the first small pixel electrode, the second large pixel electrode and the second small pixel electrode being respectively provided in alternatively interdigitated pattern within the gate line and source line and each of the coupling electrode lines being applied a voltage thereon; and a liquid crystal layer sandwiched between the lower substrate and the upper substrate, wherein the overlapping size of the first coupling electrode and the coupling electrode lines is unequal to the overlapping size of the third coupling electrode and the coupling electrode lines, and the overlapping size of the second coupling electrode and the coupling electrode lines is unequal to the overlapping size of the fourth coupling electrode and the coupling electrode lines.

2. The multi-domain vertical alignment LCD as claimed in claim 1, wherein the first large sub-pixel and the first small sub-pixel are respectively electrically connected to an identical source line of the source lines, and the second large sub-pixel and the second small sub-pixel are respectively electrically connected to another identical source line of the source lines.

3. The multi-domain vertical alignment LCD as claimed in claim 1, wherein the first coupling electrode, the second coupling electrode, the third coupling electrode and the fourth coupling electrode are respectively electrically connected, via a contact point, to the first large pixel electrode, the first small pixel electrode, the second large pixel electrode and the second small pixel electrode.

4. The multi-domain vertical alignment LCD as claimed in claim 1, wherein the first color dyestuff and the second color dyestuff are respectively selected from any combination of the following color dyestuffs: red, green and blue.

5. The multi-domain vertical alignment LCD as claimed in claim 4, wherein the lower substrate further comprises a plurality of common electrode lines, the first large sub-pixel and the second large sub-pixel further comprise a common electrode, respectively, and the common electrodes of the first large sub-pixel and the second large sub-pixel are overlapping with the common electrode lines.

6. The multi-domain vertical alignment LCD as claimed in claim 5, wherein the common electrode lines are adjacently provided between the gate lines, and the coupling electrode lines are adjacently provided between the source lines.

7. The multi-domain vertical alignment LCD as claimed in claim 5, wherein the upper electrode forms a first liquid crystal capacitance respectively with the first large pixel electrode and the second large pixel electrode, the upper electrode forms a second liquid crystal capacitance respectively with the first small pixel electrode and the second small pixel electrode, the coupling electrode lines form a first capacitance respectively with the first coupling electrode and the third coupling electrode, the common electrode lines form a second capacitance respectively with the common electrodes, and the coupling electrode lines form a third capacitance respectively with the second common electrode and the fourth coupling electrode.

8. The multi-domain vertical alignment LCD as claimed in claim 7, wherein the ratio of the first capacitance (Cst1_coupling) to the first liquid crystal capacitance (Clc1) is as follows:

with respect to the first coupling electrode of the first large sub-pixel or the third coupling electrode of the second large sub-pixel, corresponding to the red color dyestuff, $0.25<(Cst1\_coupling/Clc1)<0.35$;

with respect to the first coupling electrode of the first large sub-pixel or the third coupling electrode of the second large sub-pixel, corresponding to the green color dyestuff, $0.30<(Cst1\_coupling/Clc1)<0.40$; and with respect to the first coupling electrode of the first large sub-pixel or the third coupling electrode of the second large sub-pixel, corresponding to the blue color dyestuff, $0.35<(Cst1\_coupling/Clc1)<0.45$.

9. The multi-domain vertical alignment LCD as claimed in claim 7, wherein the ratio of the third capacitance (Cst2_coupling) to the second liquid crystal capacitance (Clc2) is ranged as follows:

with respect to the second coupling electrode of the first small sub-pixel or the fourth coupling electrode of the second small sub-pixel, corresponding to the red color dyestuff, $0.85<(Cst2\_coupling/Clc2)<0.95$;

with respect to the second coupling electrode of the first small sub-pixel or the fourth coupling electrode of the second small sub-pixel, corresponding to the green color dyestuff, $0.70<(Cst2\_coupling/Clc2)<0.80$; and with respect to the second coupling electrode of the first small sub-pixel or the fourth coupling electrode of the second small sub-pixel, corresponding to the blue color dyestuff, $0.55<(Cst2\_coupling/Clc2)<0.65$.

10. The multi-domain vertical alignment LCD as claimed in claim 1, wherein in the pixels, the first large sub-pixel is interleaved with the second large sub-pixel.

11. The multi-domain vertical alignment LCD as claimed in claim 1, wherein in the pixels, the first large sub-pixel is arranged to be aligned side by side with the second large sub-pixel.

12. The multi-domain vertical alignment LCD as claimed in claim 1, wherein in the pixels, the size of the first large sub-pixel is about twice the size of the first small sub-pixel and the size of the second large sub-pixel is about twice the size of the second small sub-pixel.

13. The multi-domain vertical alignment LCD as claimed in claim 1, wherein the material of the first coupling electrode, the second coupling electrode, the third coupling electrode and the fourth coupling electrode is identical with that of the gate lines.

14. The multi-domain vertical alignment LCD as claimed in claim 1, wherein the voltage on the coupling electrode line of the first small sub-pixel, has 180 degree phase difference, with the voltage on the coupling electrode line of the second small sub-pixel.

15. The multi-domain vertical alignment LCD as claimed in claim 1, wherein the voltage on the coupling electrode line of the first large sub-pixel, has 180 degree phase difference, with the voltage on the coupling electrode line of the second large sub-pixel.

16. The multi-domain vertical alignment LCD as claimed in claim 5, wherein the upper substrate further comprises a plurality of protrusions corresponding to the upper side of the coupling electrode lines or the common electrode lines.

17. A lower substrate of a multi-domain vertical alignment LCD, adapted to be placed beneath an upper substrate and assembled with the upper substrate, while with liquid crystal sandwiched therebetween, the upper substrate comprising an upper electrode and a color filter layer, the color filter layer being disposed with a first color dyestuff and a second color dyestuff, the first color dyestuff and the second color dyestuff being selected from an optional combination of red, green and blue dyestuffs, the lower substrate comprising:

a plurality of gate lines;

a plurality of source lines;

a plurality of coupling electrode lines, a voltage being applied respectively thereon; and a plurality of pixels, each of the pixels comprising a first large sub-pixel, a first small sub-pixel, a second large sub-pixel and a second small sub-pixel, in which the first large sub-pixel and the first small sub-pixel correspond to the first color dyestuff, and the second large sub-pixel and the second small sub-pixel correspond to the second color dyestuff, and in which the first small sub-pixel is adjacent to the first large sub-pixel and the second small sub-pixel is adjacent to the second large sub-pixel, the first large sub-pixel comprising a first switch element, a first coupling electrode and a first large pixel electrode, in which the first coupling electrode is electrically connected to the first large pixel electrode, the first small sub-pixel comprising a second switch element, a second coupling electrode and a first small pixel electrode, in which the second coupling electrode is electrically connected to the first small pixel electrode, the second large sub-pixel comprising a third switch element, a third coupling electrode and a second large pixel electrode, in which the third coupling electrode is electrically connected to the second large pixel electrode, the second small sub-pixel comprising a fourth switch element, a fourth coupling electrode and a second small pixel electrode, in which the fourth coupling electrode is electrically connected to the second small pixel electrode, the gate lines and the source lines being respectively connected to the switch elements, while the first large pixel electrode, the first small pixel electrode, the second large pixel electrode and the second small pixel electrode being respectively provided in alternatively interdigitated pattern within the gate line and source line, wherein the overlapping size of the first coupling electrode and the coupling electrode lines is unequal to the overlapping size of the third coupling electrode and the coupling electrode lines, and the overlapping size of the second coupling electrode and the coupling electrode lines is unequal to the overlapping size of the fourth coupling electrode and the coupling electrode lines.

18. The lower substrate of a multi-domain vertical alignment LCD as claimed in claim 17, wherein the first coupling electrode, the second coupling electrode, the third coupling electrode and the fourth coupling electrode are respectively electrically connected, via a contact point, to the first large pixel electrode, the first small pixel electrode, the second large pixel electrode and the second small pixel electrode.

19. The lower substrate of a multi-domain vertical alignment LCD as claimed in claim 17, wherein the first large sub-pixel and the first small sub-pixel are respectively electrically connected to an identical source line of the source lines, and the second large sub-pixel and the second small sub-pixel are respectively electrically connected to another identical source line of the source lines.

20. The lower substrate of a multi-domain vertical alignment LCD as claimed in claim 17, wherein the lower substrate further comprises a plurality of common electrode lines, the first large sub-pixel and the second large sub-pixel further comprise a common electrode, respectively, and the common electrodes of the first large sub-pixel and the second large sub-pixel are overlapping with the common electrode lines.

21. The lower substrate of a multi-domain vertical alignment LCD as claimed in claim 20, wherein the common electrode lines are adjacently provided between the gate lines, and the coupling electrode lines are adjacently provided between the source lines.

22. The lower substrate of a multi-domain vertical alignment LCD as claimed in claim 20, wherein the upper electrode forms a first liquid crystal capacitance respectively with the first large pixel electrode and the second large pixel electrode, the upper electrode forms a second liquid crystal capacitance respectively with the first small pixel electrode and the second small pixel electrode, the coupling electrode lines form a first capacitance respectively with the first coupling electrode and the third coupling electrode, the common electrode lines form a second capacitance respectively with the common electrodes, and the coupling electrode lines form a third capacitance respectively with the second common electrode and the fourth coupling electrode.

23. The lower substrate of a multi-domain vertical alignment LCD as claimed in claim 22, wherein the ratio of the first capacitance (Cst1_coupling) to the first liquid crystal capacitance (Clc1) is as follows:

with respect to the first coupling electrode of the first large sub-pixel or the third coupling electrode of the second large sub-pixel, corresponding to the red color dyestuff,
$0.25<(Cst1\_coupling/Clc1)<0.35$;

with respect to the first coupling electrode of the first large sub-pixel or the third coupling electrode of the second large sub-pixel, corresponding to the green color dyestuff,
$0.30<(Cst1\_coupling/Clc1)<0.40$; and with respect to the first coupling electrode of the first large sub-pixel or the third coupling electrode of the second large sub-pixel, corresponding to the blue color dyestuff,
$0.35<(Cst1\_coupling/Clc1)<0.45$.

24. The lower substrate of a multi-domain vertical alignment LCD as claimed in claim 22, wherein the ratio of the third capacitance (Cst2_coupling) to the second liquid crystal capacitance (Clc2) is ranged as follows:

with respect to the second coupling electrode of the first small sub-pixel or the fourth coupling electrode of the second small sub-pixel, corresponding to the red color dyestuff,
$0.85<(Cst2\_coupling/Clc2)<0.95$;

with respect to the second coupling electrode of the first small sub-pixel or the fourth coupling electrode of the second small sub-pixel, corresponding to the green color dyestuff,
$0.70<(Cst2\_coupling/Clc2)<0.80$; and with respect to the second coupling electrode of the first small sub-pixel or the fourth coupling electrode of the second small sub-pixel, corresponding to the blue color dyestuff,
$0.55<(Cst2\_coupling/Clc2)<0.65$.

25. The lower substrate of a multi-domain vertical alignment LCD as claimed in claim 17, wherein in the pixels, the size of the first large sub-pixel is about twice the size of the first small sub-pixel and the size of the second large sub-pixel is about twice the size of the second small sub-pixel.

26. The lower substrate of a multi-domain vertical alignment LCD as claimed in claim 17, wherein the material of the first coupling electrode, the second coupling electrode, the third coupling electrode and the fourth coupling electrode is identical with that of the gate lines.

27. The lower substrate of a multi-domain vertical alignment LCD as claimed in claim 17, wherein the voltage on the coupling electrode of the first small sub-pixel, has 180 degree phase difference, with the voltage on the coupling electrode line of the second small sub-pixel.

28. The lower substrate of a multi-domain vertical alignment LCD as claimed in claim 17, wherein the voltage on the coupling electrode of the first large sub-pixel, has 180 degree phase difference, with the voltage on the coupling electrode line of the second large sub-pixel.

29. The lower substrate of a multi-domain vertical alignment LCD as claimed in claim 17, wherein in the pixels, the first large sub-pixel is interleaved with the second large sub-pixel.

30. The lower substrate of a multi-domain vertical alignment LCD as claimed in claim 17, wherein in the pixels, the first large sub-pixel is arranged to be aligned side by side with the second large sub-pixel.

31. The lower substrate of a multi-domain vertical alignment LCD as claimed in claim 17, wherein the upper substrate further comprises a plurality of protrusions corresponding to the upper side of the coupling electrode lines or the common electrode lines.

* * * * *